(12) United States Patent
Tegtmeier et al.

(10) Patent No.: US 6,805,011 B2
(45) Date of Patent: Oct. 19, 2004

(54) SENSOR FOR RECORDING EXTENSION AND STRESS IN SOLID MATERIAL

(75) Inventors: Falk Tegtmeier, Braunschweig (DE); Manfred Peters, Wolfenbüttel (DE)

(73) Assignee: Bundesrepublik Deutschland vertreten durch das Bundesministerium für Wirtschaft und Arbeit, dieses vertreten durch den Präsidenten der Physikalisch-Technischen Bundesanstalt, Braunschweig (DE)

( * ) Notice: Subject to any disclaimer, the term of this patent is extended or adjusted under 35 U.S.C. 154(b) by 0 days.

(21) Appl. No.: 10/311,749

(22) PCT Filed: Jun. 16, 2001

(86) PCT No.: PCT/DE01/02239
§ 371 (c)(1),
(2), (4) Date: Jul. 8, 2003

(87) PCT Pub. No.: WO01/98742
PCT Pub. Date: Dec. 27, 2001

(65) Prior Publication Data
US 2004/0025596 A1 Feb. 12, 2004

(30) Foreign Application Priority Data
Jun. 19, 2000 (DE) .......................................... 100 30 099

(51) Int. Cl.$^7$ ................................................. G01N 3/00
(52) U.S. Cl. .............................. 73/788; 73/760; 72/57; 72/150; 72/465; 374/45
(58) Field of Search ....................... 73/760–854; 72/57, 72/150, 465; 374/45–57

(56) References Cited

U.S. PATENT DOCUMENTS

| | | | | |
|---|---|---|---|---|
| 4,462,256 A | * | 7/1984 | Moffett | 73/642 |
| 4,542,655 A | | 9/1985 | Park et al. | |
| 4,901,580 A | * | 2/1990 | Potts | 73/788 |
| 5,633,467 A | * | 5/1997 | Paulson | 73/800 |
| 6,417,466 B2 | * | 7/2002 | Gross et al. | 177/211 |

FOREIGN PATENT DOCUMENTS

| | | |
|---|---|---|
| EP | 0 344 496 A2 | 5/1989 |
| EP | 0 429 399 A2 | 11/1990 |

* cited by examiner

*Primary Examiner*—Edward Lefkowitz
*Assistant Examiner*—Alandra Ellington
(74) *Attorney, Agent, or Firm*—Whitham, Curtis & Christofferson, P.C.

(57) ABSTRACT

A force transducer is inserted into a small boring inside a test object. Inside the boring, it can measure the elastic extensions caused by the surrounding stress matrix. The force transducer is provided in two parts. Both parts are provided with a conical inner boring or conical outer periphery in such a manner that they can be held inside the boring of the test object by a tractive force. In order to span a large tolerance zone, the outer part is axially provided with multiple slits on both sides. The outer part is provided with a polygonal shape and thereby detects the deformations to be measured, not over the entire periphery, but it records theres via the contacts axially oriented through the axial lines. The extension is integrated in a peripheral direction between the contacts and is transferred into the inner part.

4 Claims, 2 Drawing Sheets

SENSOR FOR RECORDING EXTENSION AND STRESS IN SOLID MATERIAL

BACKGROUND OF THE INVENTION

1. Field of the Invention

The invention relates to a sensor for detecting multi-component states of stress and strain in solid materials, which is introduced into a bore made into the material and can there measure the elastic deformations caused by the surrounding stress states. The invention can be used in inter alia the building and construction industry, where, for the purpose of optimum structural maintenance and monitoring, it is necessary to check the loading in individual segments by means of accurate, long-term measurements.

2. Description of Related Art

The state of the art includes a) the measurement of plane stress states in solid bodies, which is carried out by direct application of strain gages to the material. Owing to the chemical sensitivity of the adhesion between material and gage, this device can be used for only a limited time. Moreover, the direct application of strain gages can be brought about only by means of costly pretreatment in a construction environment owing to the need for an extremely clean condition of the application location.

b) individual strain gages which are glued on a stainless steel plate and welded onto a structure. With this arrangement, introduction into the structure is not possible. Only plane stress states can be measured. Measurements may be incorrect on account of effects of the welding process and the dependence of the welding spots on external conditions.

c) the measurement of forces by a sensor which, in the form of an overdimensioned ring with a fine outer knurling, is pressed into a bore. It is characteristic of this type of sensor that the measuring range is limited by the requirement for slip-free force transmission over the entire contact periphery. The limit is set by a material-dependent finite contact-pressure force and the friction coefficient. In practice, a strain limit of less than 0.02% is stated for the measuring range. Experience shows that this strain limit is continually exceeded at those points in structures which are of interest for monitoring. The sensor requires great precision of the bore with regard to tolerances and must be pressed in extremely accurately. This type of sensor is therefore used only in applications with low load limits, such as level measurements. Furthermore, the range may have only the low strain values mentioned above. In order to ensure this, a prior analysis of the stress states is necessary, so that no measuring errors are caused by different components.

BRIEF SUMMARY OF THE INVENTION

Development of a sensor which makes possible reproducible detection of the stress states over the entire elastic deformation range of typical construction materials, in particular steel, concrete and stone. Widening the measuring range to include all the elastic strain values occurring in the construction sector is essential in highly utilized structures of an efficient structural design. It is to make possible structural monitoring which detects defects at an early stage and in this state still allows cost-effective structural maintenance countermeasures.

According to the invention, this object is achieved by virtue of the fact that a) a strain transmission body, referred to here as the inner part 2, which is conical in the longitudinal configuration is secured in a similarly conical deformation body, referred to here as the outer part 1, by a retaining force, b) the outer part 1 is slotted several times in the axial direction alternately from the front side and rear side, c) the outer part 1 is at least triangular in form and thus touches the bore of the test object only with axial line-like contact ridges d) and the inner part 2 is equipped with measuring pick-ups 3.

DETAILED DESCRIPTION OF THE SEVERAL VIEWS OF THE DRAWINGS

DETAILED DESCRIPTION OF THE INVENTION

Figure 1:
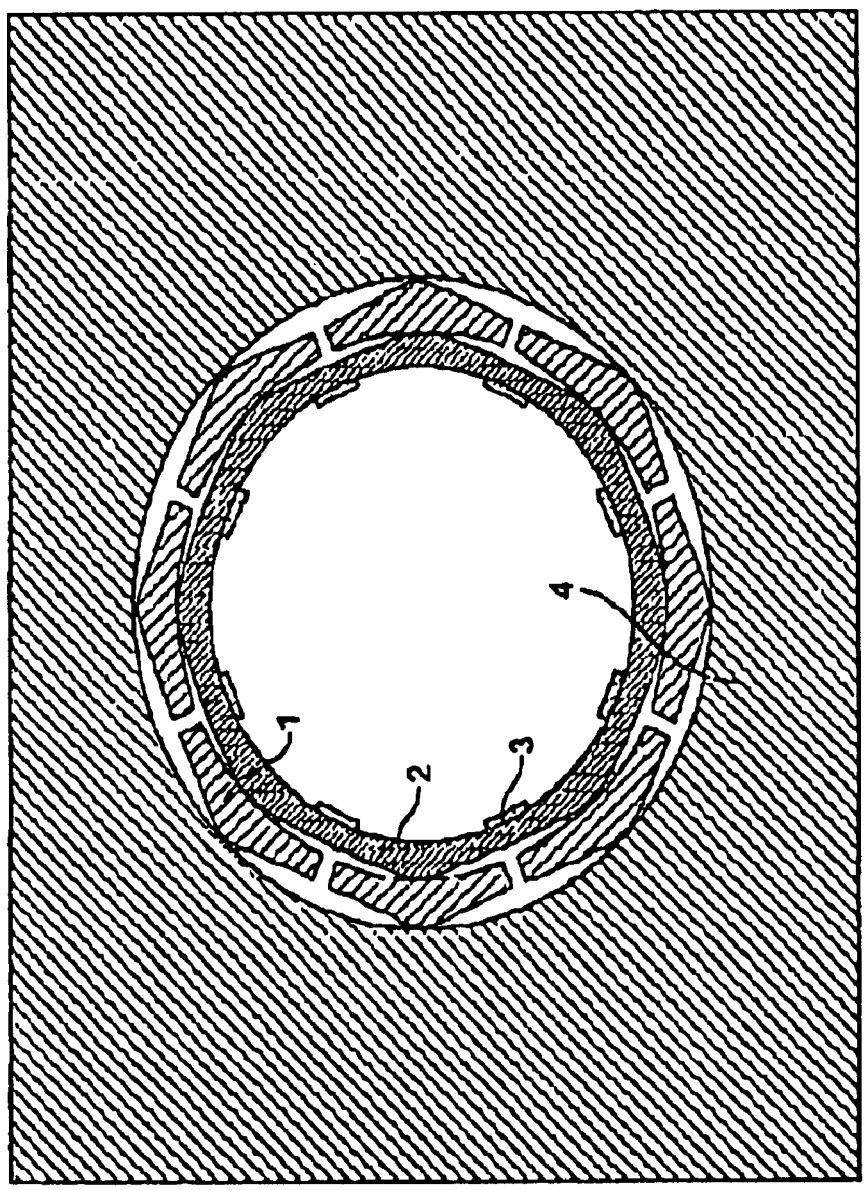
FIG. 1 is an end view of the sensor configuration of the present invention.
Figure 2:
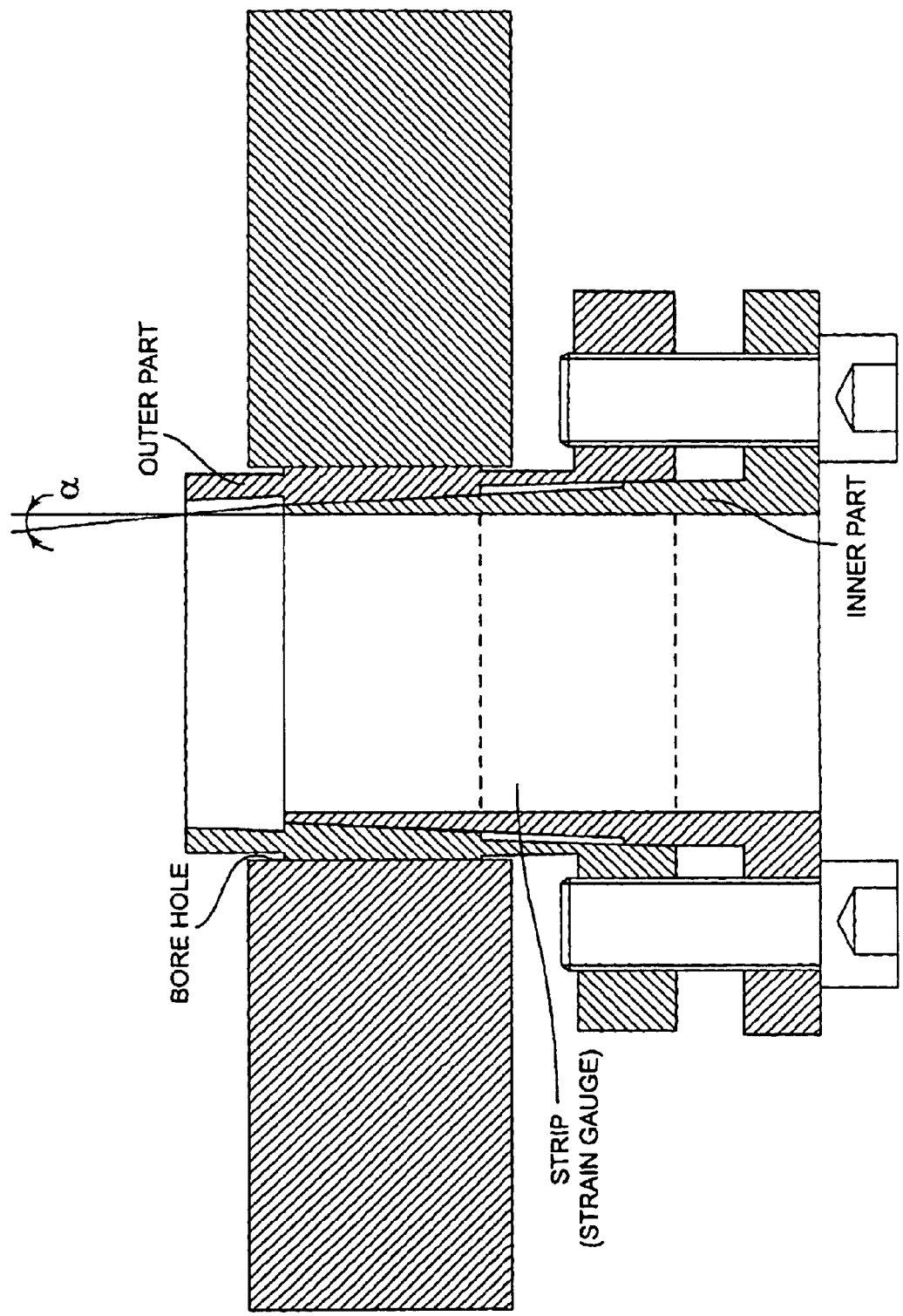
FIG. 2 is a longitudinal section of the sensor configuration of the present invention showing the outer part plus inner part within a bore hole.

With reference to FIGS. 1 and 2, the sensor is composed of the outer part 1 and the inner part 2. The contact area of the inner and outer parts 1, 2 is shaped conically in the longitudinal configuration. The inner part 2 is pressed into the outer part 1 by means of any type of force introduction, for example by retaining screws or hydraulic presses. The cone angler should preferably be less than 4.5 degrees so that the sensor is secured in a self-locking manner.

In order to keep the tolerance requirements for the bore low, the outer part 1 is slotted from the front and the rear alternately in the direction of the bore, so that it can expand in its periphery like a spring element and adapts to the bore diameter by means of the conical inner part 2.

The outer surfaces of the outer part 1, which are aligned in the bore direction, are of at least triangular, polygonal design, so that they make contact with the inner surface of the bore of an object to be tested with only what are ultimately wide lines.

The inner part 2 is either angular or round. Even in an angular structural shape, the inner part 2 is not of completely polygonal design in its direction tangential to the bore axis. It is necessary for the zone of contact with the outer part 1 to be made in the form of an area instead of a line in order to stabilize the torsion-sensitive contact tongues of the outer part 1, in other words in order to avoid the state of a statically underdefined system for these segments. The inner part 2 is to be introduced into the outer part 1 in such a way that the corners of the inner and the outer part lie on the same angle lines about the center of the bore. In the case of a round shape of the inner part 2, the limited zone of contact with the internally round, conically tapering outer part 1 can preferably be produced by correspondingly wide slotting of the outer part 1. In both cases, the strain is transferred to those areas of the inner part 2 which are free of contact with the outer part 1. The strain is thus integrated between the outer contacts over the angle around the bore center of the sensor and represented in the elastic deformation of this area of the inner part 2. There, it is recorded using any type of measuring method, for example strain gages 3.

For measurement of the strains transferred to the inner periphery of the inner part 2, all possible forms of recording for strain measurement can be considered. The inner bore can also be used for measurement purposes with other arrangements such as, for example, space-crossing tension bars or membranes. The use of contactless measuring pick-ups is also conceivable.

In the interest of measuring accuracy, it is to be ensured that the transverse connections between those segments of the outer part 1 which are aligned in the bore direction and produced by the slotting do not make contact with that zone of the inner part 2 which is relevant for measurement purposes. This can be achieved by, for example, appropriate machining of the conical inner bore in the outer part 1 to a larger diameter.

The line-like contact ridges of the angular sensor can be interrupted centrally by appropriate recesses, so that the contact zones remain in only an approximately point-shaped form, primarily at the outer edges of the bore. The sensor is thus also capable of detecting load components outside the actual load plane at right angles to the bore axis.

The sensor can be made from various materials. These can be adapted to the test object 4, for example soft materials for plastics or wood, steel for concrete and metals. For a very high measuring range, for example, titanium could be used.

The sensor according to the invention is suitable in particular for detecting the stress matrix in a structural environment. For this application in concrete and steel, an embodiment made of special steel is suitable on account of the elastic properties and the corrosion resistance. In practice, outer fastening by means of four tension bolts proves to be advantageous and easy to handle. In order to obtain information about a plane load case with tension and thrust components occurring in structural engineering, an octagonal embodiment is most suitable in order to assign individual measuring signals to the load components. In this connection, a measuring pick-up embodiment with strain gages on the inner bore of the inner part can be used.

For the sensor, a measuring method for defect detection has been developed, which makes possible simple monitoring of potential weak points in the structure by stress matrix comparison. In this connection, the measurements of a detection sensor, which delivers signals relating to defects present in the structure, and the measurements of a reference sensor, which provides information about the load conditions in the structure, are compared with one another in their signal behavior. Where the adaptation of the two sensors takes place is to be selected in such a way that the load-dependent output signals in the defect-free state differ only by a constant factor. By means of a sensitivity adjustment, the signals are adjusted on a measuring amplifier, so that their difference is equal to zero. As material changes have only local effects in their initial phase, only the sensor close to the defect is affected in its stress matrix. The load-dependent signal variation changes, and there is a finite difference signal between the sensors. Suitable positioning can be determined by a Finite Element Method Analysis (FEM Analysis). It is also possible, however, to formulate the experimental values from such analyses in a universally valid manner in a collection of tables for various weak points. The measuring method can be extended by installing further reference sensors, so that load location and load magnitude are determined. A signal for one of a number of possible detection sensors can be calculated from the combination of load magnitude and load location.

The way in which the measuring method is carried out ensures that a sensor defect does not remain undiscovered. If a sensor fails, the signal difference is not equal to zero.

Compared with the methods described in the Background of the Invention above, the sensor according to the invention affords the advantages described below.

The outer part makes possible great expansion owing to the multiple slotting, so that only low requirements have to be set for the bore into which the sensor is inserted. This results in rapid and thus cost-effective mounting using typical construction tools, without special training of the fitters being necessary.

By virtue of the angular construction, the sensor according to the invention makes it possible to raise the measuring range above the limit determined from the ratio of tangential adhesive force to radial contact-pressure force by means of the adhesion coefficient under ideal conditions, in the case of steel therefore roughly at a strain of 0.1%. A material-dependent finite vertical contact-pressure force leads to a transmittable tangential measuring force reduced by the adhesion coefficient. This force must not be exceeded anywhere on the inner surface of the bore, as there will otherwise be friction-dependent hysteresis. In the sensor according to the invention, this limitation of flat-area strain transmission is avoided by means of axial, ridge-shaped contacts. Between these, the strain is integrated in the peripheral direction and transmitted to the inner part with strain gages applied.

By means of optimum dimensioning, the relationship between the radial contact-pressure of the linear contacts, which leads to the adhesion, and the tangential elasticity of the sensor can be optimized, so that, for example, within the elastic range of steel as a typical construction material, a virtually hysteresis-free, linear transmission behavior can be determined.

By means of central recesses on the linear contacts of the outer part, the sensor according to the invention can be extended to perform spatial multi-component measurement.

What is claimed is:

1. Sensor for measuring force and strain in solid materials, designed to be inserted in axial direction in a bore within a solid material, comprising:

an outer part suited to be inserted in said bore and having a multi-angled outer surface so as to touch the bore of the sold material with axial line-like contact ridges, the outer part being slotted in an axial direction alternately from both axial ends of the outer part so as to allow an expansion of the outer part for adapting its periphery to the bore, and having an inner periphery conical in the axial direction, an inner part having a correspondingly conical outer periphery so as to allow the inner part to be pressed axially into the outer part so that the corresponding conical inner periphery of the outer part and the outer periphery of the inner part contact against each other, and measuring sensors fixed to the inner side of the inner part sensing forces and strains of the inner part resulting from corresponding forces and strains within the solid material.

2. Sensor according to claim 1 wherein at a contact zone of the inner part and the outer part, the slots in the outer part cut through the contact area completely or partly.

3. Sensor according to claim 1 wherein the line-like contact ridges are formed by corners for contact with the bore.

4. Method for defect detection, comprising the steps of using a sensor according to claim 1 in connection with further reference sensors and detection sensors and comparing between points influenced by material change and points not influenced by material change.

* * * * *